US010395270B2

(12) United States Patent
Forte et al.

(10) Patent No.: US 10,395,270 B2
(45) Date of Patent: Aug. 27, 2019

(54) SYSTEM AND METHOD FOR RECOMMENDING A GRAMMAR FOR A MESSAGE CAMPAIGN USED BY A MESSAGE OPTIMIZATION SYSTEM

(75) Inventors: Rui Miguel Forte, Athens (GR); Avishalom Shalit, Orpington (GB); Guy Stephane Krief, Papagou (GR); Assaf Baciu, London (GB)

(73) Assignee: PERSADO INTELLECTUAL PROPERTY LIMITED, London (GB)

( * ) Notice: Subject to any disclaimer, the term of this patent is extended or adjusted under 35 U.S.C. 154(b) by 545 days.

(21) Appl. No.: 13/474,695

(22) Filed: May 17, 2012

(65) Prior Publication Data

US 2013/0311269 A1 Nov. 21, 2013

(51) Int. Cl.
*G06Q 30/00* (2012.01)
*G06Q 30/02* (2012.01)

(52) U.S. Cl.
CPC ..... *G06Q 30/0241* (2013.01); *G06Q 30/0276* (2013.01); *G06Q 30/0261* (2013.01); *G06Q 30/0269* (2013.01)

(58) Field of Classification Search
CPC ....................... G06Q 30/0241; G06Q 30/0261
USPC ..................................... 705/14, 14.54, 14.41
See application file for complete search history.

(56) References Cited

U.S. PATENT DOCUMENTS 4,930,077 A 5/1990 Fan
5,173,854 A 12/1992 Kaufman et al.
5,652,828 A 7/1997 Silverman
6,278,967 B1 8/2001 Akers et al.
6,400,996 B1 6/2002 Hoffberg et al.
(Continued)

FOREIGN PATENT DOCUMENTS

WO 2001048666 7/2001
WO WO-0148666 A1 * 7/2001 ............ G06Q 30/02
WO 2011076318 6/2011

OTHER PUBLICATIONS

Alan G. Sawyer (1982) ,"Statistical Power and Effect Size in Consumer Research", in NA—Advances in Consumer Research vol. 09, eds. Andrew Mitchell, Ann Abor, MI : Association for Consumer Research, pp. 1-7.*
(Continued)

*Primary Examiner* — Michael Bekerman
*Assistant Examiner* — Scott Snider
(74) *Attorney, Agent, or Firm* — Lessani Law Group, PC

(57) ABSTRACT

A system and method is provided for recommending a grammar for a message campaign used by a message optimization system. A user specifies parameters for a new campaign, from which a set of statistical design budgets is calculated. The user selects a grammar structure, recommended based on the statistical design budgets, for the campaign. The n-most relevant past campaigns are identified. Semantic tags, associated with each previously used value from the n-most relevant past campaigns and each of a plurality of untested values, are identified and ranked based on past performance. The previously used values are ordered by ranked tag group and then within each tag group, while the untested values are ordered by ranked tag group and then randomly within the tag group. Recommended values are selected from the ranked list of previously used values and untested values depending on the degree of exploration/conservatism indicated by the user.

22 Claims, 6 Drawing Sheets

(56) References Cited

U.S. PATENT DOCUMENTS

| | | | | |
|---|---|---|---|---|
| 6,470,306 | B1 | 10/2002 | Pringle et al. | |
| 6,647,383 | B1 | 11/2003 | August et al. | |
| 6,687,404 | B1 | 2/2004 | Hull et al. | |
| 6,760,695 | B1 | 7/2004 | Kuno et al. | |
| 6,934,748 | B1 | 8/2005 | Louviere et al. | |
| 6,978,239 | B2 | 12/2005 | Chu et al. | |
| 7,006,881 | B1 | 2/2006 | Hoffberg et al. | |
| 7,013,427 | B2 | 3/2006 | Griffith | |
| 7,130,808 | B1 | 10/2006 | Ranka et al. | |
| 7,133,834 | B1 | 11/2006 | Abelow | |
| 7,137,126 | B1 | 11/2006 | Coffman et al. | |
| 7,167,825 | B1 | 1/2007 | Potter | |
| 7,181,438 | B1 | 2/2007 | Szabo | |
| 7,302,383 | B2 | 11/2007 | Valles | |
| 7,363,214 | B2 | 4/2008 | Musgrove et al. | |
| 7,406,434 | B1 | 7/2008 | Chang et al. | |
| 7,493,250 | B2 | 2/2009 | Hecht et al. | |
| 7,769,623 | B2 * | 8/2010 | Mittal et al. | 705/7.32 |
| 7,797,699 | B2 | 9/2010 | Kagi et al. | |
| 7,945,573 | B1 | 5/2011 | Barnes et al. | |
| 8,260,663 | B1 * | 9/2012 | Ranka | G06Q 30/0244 705/14.4 |
| 8,689,253 | B2 * | 4/2014 | Hallberg et al. | 725/37 |
| 8,762,496 | B1 | 6/2014 | Kiveris | |
| 9,268,769 | B1 | 2/2016 | Shalit et al. | |
| 9,741,043 | B2 | 8/2017 | Vratskides et al. | |
| 2002/0156688 | A1 | 10/2002 | Horn et al. | |
| 2002/0174144 | A1 | 11/2002 | Wolpe | |
| 2005/0027507 | A1 | 2/2005 | Patrudu | |
| 2005/0039116 | A1 | 2/2005 | Slack-Smith | |
| 2005/0060643 | A1 | 3/2005 | Glass et al. | |
| 2005/0076003 | A1 | 7/2005 | DuBose et al. | |
| 2005/0234850 | A1 | 10/2005 | Buchheit et al. | |
| 2006/0155567 | A1 | 7/2006 | Walker et al. | |
| 2006/0212524 | A1 | 9/2006 | Wu et al. | |
| 2006/0259360 | A1 | 11/2006 | Flinn et al. | |
| 2007/0033002 | A1 | 2/2007 | Dymetman et al. | |
| 2007/0055931 | A1 | 3/2007 | Zaima et al. | |
| 2007/0127688 | A1 | 6/2007 | Doulton | |
| 2007/0153989 | A1 | 7/2007 | Howell et al. | |
| 2007/0168863 | A1 | 7/2007 | Blattner et al. | |
| 2007/0233566 | A1 * | 10/2007 | Zlotin | G06Q 30/02 705/14.41 |
| 2007/0239444 | A1 | 10/2007 | Ma | |
| 2007/0260740 | A1 | 11/2007 | Guan | |
| 2007/0281286 | A1 | 12/2007 | Palacios | |
| 2008/0059149 | A1 | 3/2008 | Martin | |
| 2008/0109285 | A1 | 5/2008 | Reuther et al. | |
| 2008/0178073 | A1 | 7/2008 | Gao et al. | |
| 2008/0255944 | A1 * | 10/2008 | Shah | G06Q 30/02 705/14.47 |
| 2008/0281627 | A1 * | 11/2008 | Chang et al. | 705/1 |
| 2008/0300857 | A1 | 12/2008 | Barbaiani et al. | |
| 2008/0313259 | A1 | 12/2008 | Correa | |
| 2009/0063262 | A1 * | 3/2009 | Mason | G06Q 30/02 705/14.54 |
| 2009/0110268 | A1 | 4/2009 | Dejean et al. | |
| 2009/0150400 | A1 | 6/2009 | Abu-Hakima et al. | |
| 2009/0177750 | A1 | 7/2009 | Lee et al. | |
| 2009/0210899 | A1 | 8/2009 | Lawrence-Apfelbaum et al. | |
| 2009/0226098 | A1 | 9/2009 | Takahashi et al. | |
| 2009/0254836 | A1 | 10/2009 | Bajrach | |
| 2009/0276419 | A1 | 11/2009 | Jones et al. | |
| 2009/0313026 | A1 | 12/2009 | Coffman et al. | |
| 2010/0100817 | A1 | 4/2010 | Trotter | |
| 2010/0241418 | A1 | 9/2010 | Maeda et al. | |
| 2010/0312769 | A1 | 12/2010 | Bailey et al. | |
| 2010/0312840 | A1 | 12/2010 | Chestnut et al. | |
| 2011/0040611 | A1 * | 2/2011 | Simmons | G06Q 30/02 705/14.41 |
| 2012/0005041 | A1 | 1/2012 | Mehta et al. | |
| 2012/0016661 | A1 | 1/2012 | Pinkas | |
| 2012/0095831 | A1 | 4/2012 | Aaltonen et al. | |
| 2012/0166345 | A1 | 6/2012 | Klemm | |
| 2012/0259620 | A1 * | 10/2012 | Vratskides et al. | 704/9 |
| 2017/0316430 | A1 | 11/2017 | Vratskides et al. | |

OTHER PUBLICATIONS

"Slider (Computing)"—Archived: Sep. 27, 2007—http://web.archive.org/web/20070927082640/http://en.wikipedia.org/wiki/Slider_%28computing%29.*

"Drop-Down list"—Archived: Dec. 21, 2008—http://web.archive.org/web/20081221105031/http://en.wikipedia.org/wiki/Drop-down_list.*

PCT International Preliminary Report on Patentability in corresponding PCT Application No. PCT/US2013/040616.

Hill Associates, Weighted and Round Robin Queuing, Jul. 14, 2007.

Katevenis, M., et al., "Weighted Round-Robin Cell Multiplexing in a General-Purpose ATM Switch Chip", Oct. 1991, IEEE Journal on Selected Areas in Communication, vol. 9, No. 8.

Lee, Jinkyu, et al., "Multiprocessor Real-Time Scheduling Considering Concurrency and Urgency", Special Issue of the Work-in-Progress (WIP) Session at the 2009 IEEE Real-Time Systems Symposium, Washington, D.C., Dec. 1-4, 2009.

Wikipedia "Barrier (computer science)", Sep. 26, 2010.

Wikipedia "Multi-Variate Testing", Sep. 17, 2010.

PCT Search Report and Written Opinion in corresponding PCT Application No. PCT/US2013/040616.

* cited by examiner

SYSTEM AND METHOD FOR RECOMMENDING A GRAMMAR FOR A MESSAGE CAMPAIGN USED BY A MESSAGE OPTIMIZATION SYSTEM

BACKGROUND OF THE INVENTION

1. Field of the Invention

This invention relates generally to a message optimization system and, more particularly, to a system and method for recommending a grammar for a message campaign used by a message optimization system.

2. Description of the Background Art

Commercial advertising has undergone a significant shift in the past decade. Traditional media advertising, taking the form of newspapers, magazines, television commercials, radio advertising, outdoor advertising, and direct mail, etc., has been decreasing as the primary method of reaching an audience, especially as related to certain target demographics or types of products. New media advertising, in the form of Popup, Flash, banner, Popunder, advergaming, email advertising, mobile advertising, etc., has been increasing in prominence.

One characteristic of new media advertising is the need to capture an audience's (viewers, readers, or listeners) attention with limited text. For example, with a banner or text message, the sponsor of the advertising message may only have a finite number of characters to persuade its audience to act by clicking on a link, texting back a message, etc. As a result, companies are increasingly interested in how to optimize their message, and the components in the message, to increase the message's response rate. International Publication Number WO 2011/076318 A1 discloses a system and method for optimizing a message and is incorporated by reference herein in its entirety. In this system, the message is divided into components and multiple values are tested for each component to determine the best response rates.

The best message optimization system, however, is only as good as its starting values. In the past, a user, or campaign manager, would manually choose the starting values. However, an inexperienced campaign manager may not know what values to start with. Therefore, there is a need for a system and method for recommending an initial grammar for a message campaign used by a message optimization system based on the data from previous campaigns.

SUMMARY OF THE INVENTION

The present invention is directed to a system and method for recommending a grammar for a message campaign used by a message optimization system. The method includes enabling a campaign manager to specify one or more parameters for a new campaign. A set of statistical design budgets is calculated based on one or more of the specified parameters. In one embodiment, the statistical design budgets are calculated based on audience size, effect size, and expected response rate.

At least one grammar structure is recommended based on the set of statistical design budgets, where the grammar structure specifies a plurality of message component types. A campaign manager is then able to select one of the recommended grammar structures for the new campaign. The n-most relevant past campaigns are identified based on the specified parameters. For each message component type in the selected grammar structure, a ranked list of previously used values for the component type in the n-most relevant past campaigns is generated, where the values are ranked at least in part based on performance in the n-most relevant past campaigns. For each message component type, a plurality of values is selected to recommend based at least in part on the ranked list.

The campaign manager is able to reject one or more of the recommended values. In response to the campaign manager rejecting one or more of the recommended values, alternate recommended values are provided for the rejected values. In certain embodiments, providing alternate recommended values for the rejected values comprises choosing values from the next best performing tag or another candidate value associated with the same tag as the previously rejected value. In one embodiment, the method further comprises evaluating the recommended grammar based on various computed metrics.

In one embodiment, the previously used values are each associated with a semantic tag. Generating the ranked list includes identifying the tags associated with the previously used values in the n-most relevant campaigns. The tags are then ranked based on performance of tagged values in the n-most relevant campaigns. The previously used values are ordered first by ranked tag group and second, within each tag group, by the number of time an individual value has been identified as the winning value in the n-most relevant campaigns.

In one embodiment, the recommend values are selected in part from the ranked list of previously used values and in part from a ranked list of untested values. A plurality of untested values may be grouped by semantic tag and ranked according to their semantic tag, where within a tag group an untested value is randomly ranked. The percentage of recommended untested values may depend on a degree of exploration/conservatism indicated by the campaign manager.

In one embodiment, enabling a campaign manager to specify parameters for a new campaign includes providing a user interface wherein the campaign manager is prompted to enter parameters for the campaign. One or more parameters in the user interface may be associated with a drop down menu that lists the options available to the campaign manager for the parameter. The parameters may comprise campaign duration, audience size and characteristics, expected response rate, effect size, constraints, and objectives of the campaign. The campaign manager may select the objectives of the campaign via a drop down menu, from a sliding scale, or by inputting a value. In certain embodiments, if the campaign manager does not specify certain parameters, default values, empirically determined based on past campaigns, are used.

The present invention provides many unique advantages. For example, multiple campaign managers are able to centrally and efficiently access the consolidated, distilled information from each of their individual campaigns. This allows novice campaign managers to become productive very quickly and allows individual campaign managers to manage a greater number of campaigns at the same time. For example, whereas previously a campaign manager would need at least 2 to 3 hours to run a single campaign, a campaign manager using the present system is able to process campaigns orders of magnitude faster.

DETAILED DESCRIPTION OF THE PREFERRED EMBODIMENTS

The present invention provides a system and method for recommending a grammar for a message campaign used by a message optimization system. The message optimization system uses the grammar to automatically generate variations of the message and test at least some of the variations.

As used herein, a "component" is a functional part of a message. Components may be tangible, such as an introduction, benefit, or a call to action, or they may be intangible, such as the level of formality, the verb tense, or the type of persuasion. Components are filled with "values," which may be categorized by families. For example, values filling the introduction component may be from the greetings category (e.g., "Congratulations!", "Hello!", etc.) or they may be from the urgency category (e.g., "Only Today!", "Act Now!", etc.) or from other categories. The type of components and the values tested for each component are the "grammar" of the message. The invention as described herein applies to context-free grammars and grammars that are not context-free.

Shown below is a simple example grammar named "sentence", consisting of four components: "intro", "benefit", "product", and call to action or "cta". Next to each listed component are values that may fill the component. For example, the introduction component may be filled with "Congratulations!" or "Great news!".

sentence->[intro] [benefit] [product] [cta]

intro->Congratulations! |Great news!

benefit->We have a great offer for you! |Take advantage of this unique opportunity!

product->Top up your phone with 5$ and get 2$ on us! |For every 5$ top-up we'll give you 2$ extra!

cta->Act now and top up! |Top-up your phone today and win! |Don't waste time, top-up today!

A "campaign" is the process for testing grammar structures and values for the structures to determine which structures and values receive the best response rate, where the "response rate" is the acceptance of a call to action (e.g., calling a number, sending an sms to a number, clicking on a weblink, clicking on a mobile weblink, proceeding to purchase, etc.). The "expected response rate" is the rate the campaign manager expects to get from the target audience for the campaign (e.g., 3%, 5%, etc.). The "effect size" is the percentage difference in the response rate that can be created by varying the values of the components. A "campaign manager" is the user of the message optimization system.

Figure 1A:
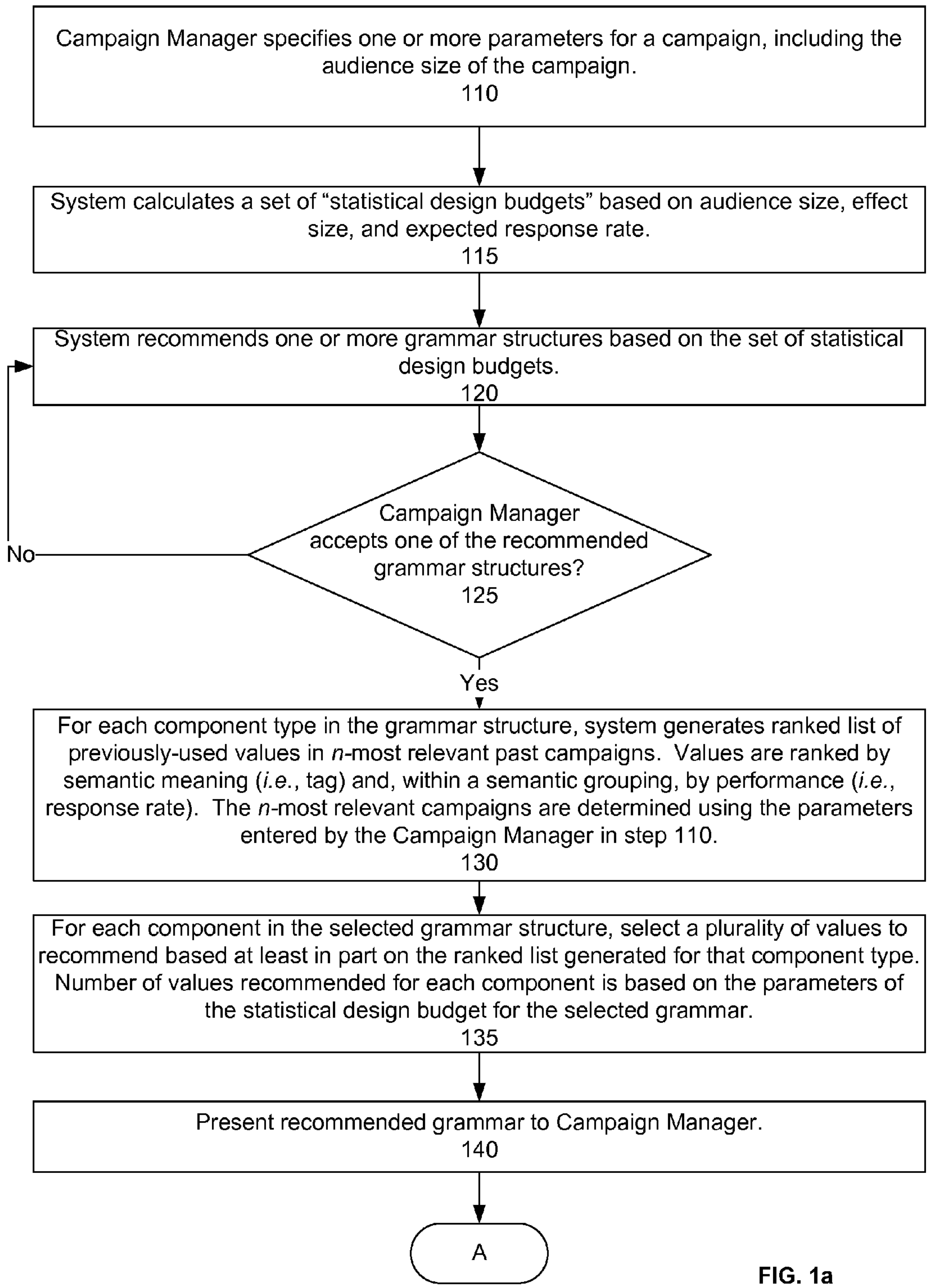
FIGS. 1*a*-1*b* are a flowchart that illustrates a method for recommending a grammar according to one embodiment of the invention.
Figure 1B:
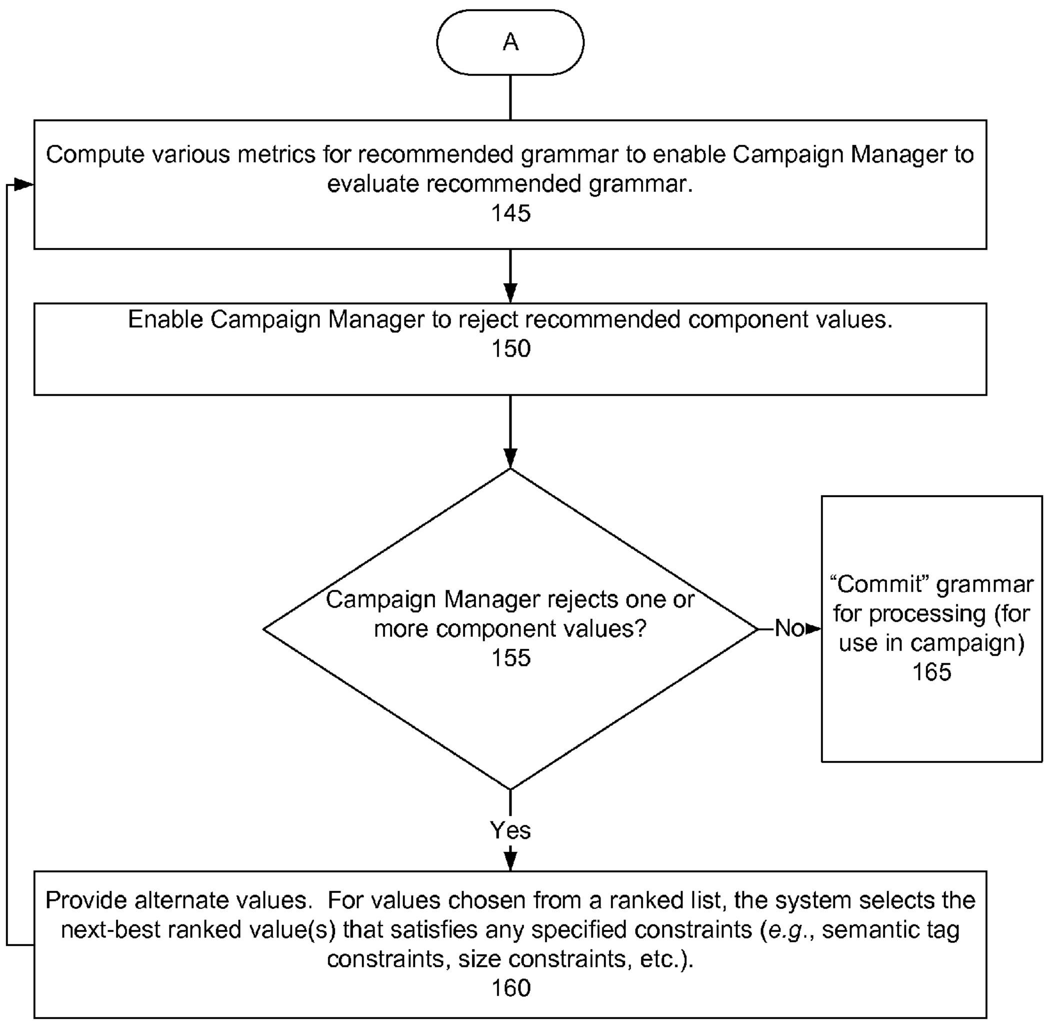

FIGS. 1*a*-1*b* show the preferred method for recommending a grammar. The campaign manager specifies one or more parameters for a campaign (step 110). The recommendation system generates a user interface that enables a campaign manager to enter parameters for a campaign. In one embodiment, a plurality of configurable parameters is each associated with a drop down menu that lists the options available to the campaign manager for the parameter. Examples of parameters include country, client, language, campaign duration, product, type of offer, promotion channel, activation/participation channel, whether the campaign is a continuation or repetition of a previous campaign, audience size and characteristics (e.g., gender), expected response rate, effect size, pValues, constraints (e.g., message length constraints, mandatory components, etc.), and grammar quality, etc. In a preferred embodiment, the campaign manager selects the objectives of the campaign (i.e., the degree of conservatism/exploration or tested versus untested values). The campaign manager may select from a drop down menu, select from a sliding scale, or use other means to indicate the campaign objectives. In certain embodiments where the campaign manager does not specify certain parameters, the system uses default values that are empirically determined based on past campaigns. For example, parameters n or k, discussed below, may be empirically determined and set as system-wide parameters.

The system calculates a set of "statistical design budgets" based on audience size, effect size, and expected response rate (step 115). The statistical design budget for a campaign is the number of components in a message and the number of values to test for each component. Different variations can have the same or almost the same statistical design budget. For example, a grammar with three message components and four values for each component will generate the same number of message variations as message with four components and three values to test for each. The number of values associated with each component can vary within a grammar. For example, there may be five values for one component and two values for another.

If the effect size is small (i.e., the percentage difference between the response rate of two values is small), then the audience size must be large in order to return statistically significant data. For example, if Component Value A has a response rate of 3.0% and Component Value B has a response rate of 3.3%, the difference in absolute terms is 0.3% or an effect size of 10%.

A person skilled in the art would understand that an effect size of 0-5% is negligible, such that it would be very hard to differentiate between variations in response rates and inherent noise. An effect size of 5-10% is generally considered very small and would require a very large sample in order to establish the statistical significance. An effect size of 10-15% is considered small and would require a relatively large sample, but not as large as the sample required for an effect size of 5-10%. An effect size of 15-30% is generally considered "medium" and is the focal point of interest in most optimization scenarios. An effect size of 30% or greater is large and usually observed when using extreme component values or with very small response rates. In the above example, the system would need a very larger audience size in order to produce useful data.

The expected response rate is the response rate (from the target audience) that the campaign manager expects to get for the campaign (e.g. 3%, 5%, etc.). In one embodiment, a campaign manager can specify the effect size and response rate in step 110. If the campaign manager does not specify the effect size and the response rate, the system may use default values that are empirically determined based on past campaigns.

Returning again to FIG. 1, the system recommends one or more grammar structures (i.e., the type of components and the initial organization of the components within the grammar) based on the set of statistical design budgets (step 120).

In other words, the system attempts to recommend a grammar structure that fits within the set of statistical design budgets. In the example grammar above, the grammar structure is: sentence->[intro] [benefit] [product] [cta]. In recommending a grammar structure, the system may consider appropriate components to break the message up based on established practices in similar campaigns or commonly recurring components across a plurality of campaigns. If the campaign manager rejects all of the recommended grammar structures, the system recommends additional grammar structures.

If the campaign manager accepts one of the recommended grammar structures (step 125), then, for each component type in the grammar structure, the system generates a ranked list of previously used values in the n-most relevant past campaigns (step 130). In the preferred embodiment, values are ranked by semantic meaning (i.e., tag applied by the campaign manager) and, within a semantic grouping, by performance (i.e., response rate). The n-most relevant campaigns are determined using the parameters entered by the campaign manager in step 110.

For each component in the selected grammar structure, the system selects a plurality of values to recommend based at least in part on the ranked list generated for that component type (step 135). Other factors that the system may consider in recommending candidate values are values that satisfy any constraints on category or length (i.e., values that do not satisfy length/category strength are filtered out), winners from grammars in similar past campaigns, values that have performed well in general, or values from lists of untested values. The system may also consider synonyms or semantically related values to other well performing candidate values from past campaigns. Values across languages may be chosen based on their translation. The system may also select values from both a ranked list of previously used values and in part from a ranked list of untested values based on the degree of conservatism/exploration indicated by the campaign manager. The number of values recommended for each component is based on the parameters of the statistical design budget for the selected grammar. The recommended grammar is then presented to the campaign manager (step 140).

In one embodiment, the system computes various metrics for the recommended grammar to enable the campaign manager to evaluate the recommended grammar (step 145). Factors affecting the evaluation of the recommended grammar may include the degree of exploration of the grammar (i.e., how many new/untested component values are being tried versus how many are tried and tested), the "structural spread" of the grammar (i.e., whether the grammar branches out across a wide variety of syntactic constructs or whether it narrowly explores a small area), how much of the design budget is being spent (i.e., how many messages does the experimental design predict we need to send in order to fully test the grammar), how is the distribution across message components (i.e., are some components being tested across a wide range of candidate values and others only a few), amount of wasted text space (i.e., whether short components are being compared with long components where the long component values are reserving unnecessary space), how close we are to the optimal grammar (i.e., sometimes the campaign manager will choose a suboptimal candidate value as the top values from the top performing tags may be overused), degree of repeatability (i.e., how similar is the recommended grammar to the grammars that have recently been used on this audience), and degree of novel investment (i.e., whether the system is testing a large number of values in components that generally have fewer combinations or vice versa). The metrics applied to the recommended grammars need to be interpreted in light of the parameters of a particular campaign and the objectives of the campaign manager.

The campaign manager is able to reject recommended component values (step 150). For example, there may be legal or branding issues with certain expressions that the campaign manager wishes to avoid. If the campaign manager rejects one or more of the component values (step 155), the system provides alternate values (step 160). For values chosen from a ranked list, the system selects the next best value(s) that satisfies any specified constraints (e.g., semantic tag constraints, size constraints, etc.). The campaign manager may choose values from the next best performing tag or another candidate value associated with the same tag as the previously rejected value. The system then computes the various metrics for the recommended grammar with the alternate values according to step 145. If, however, the campaign manager does not reject any component values, the system "commits" the grammar for processing (for use in the campaign) (step 165).

In certain embodiments, data from past campaigns is stored in one or more databases. The data may include the grammar that was used, parameters related to the campaign (e.g., country, client, language, campaign duration, product, type of offer, promotion channel, activation/participation channel, whether the campaign is a continuation or repetition of a previous campaign, audience size and characteristics, expected response rate, effect size, constraints, grammar quality, objectives of the campaign, etc.), the response rate, the corresponding pValue for the response rate, etc. The response rates, pValues, and other data may be automatically entered by a message optimization system when a campaign is run. Typically, a campaign manager manually tags values with semantic tags.

Figure 2:
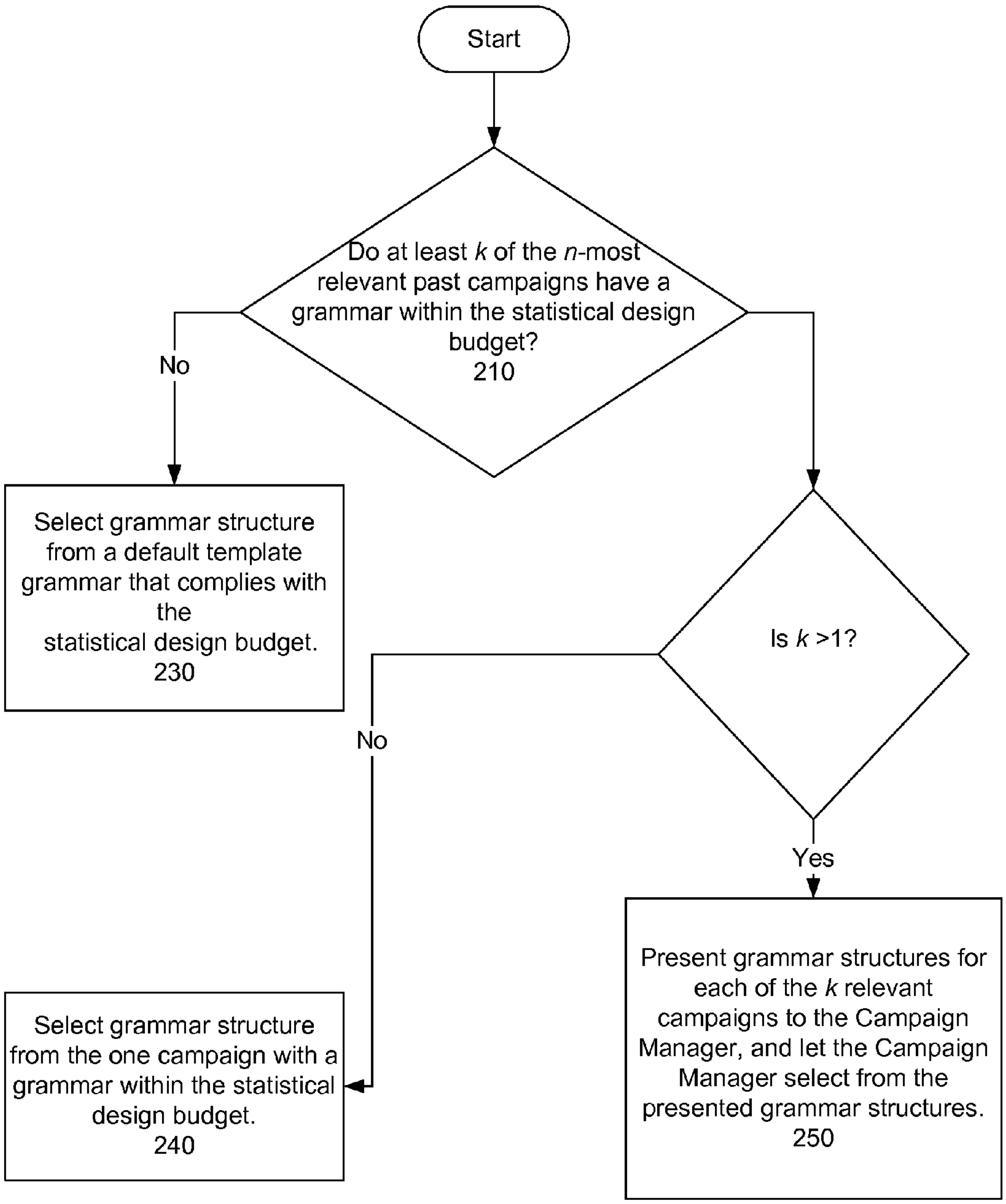
FIG. 2 is a flowchart that illustrates a method for recommending a grammar structure according to one embodiment of the invention.

FIG. 2 illustrates a process for recommending a grammar structure according to step 120 in FIG. 1. The system first determines whether at least k of the n-most relevant past campaigns have a grammar within the statistical design budget (step 210). If not, the system selects a grammar structure from a default template grammar that complies with the statistical design budget (step 230). If it does, then the system determines whether k is greater than the value 1. If not, the system selects a grammar structure from the one campaign with a grammar within the statistical design budget (step 240). If it is, the system presents grammar structures for each of the k relevant campaigns to the campaign manager and lets the campaign manager select from the presented grammar structures (step 250).

Figure 3:
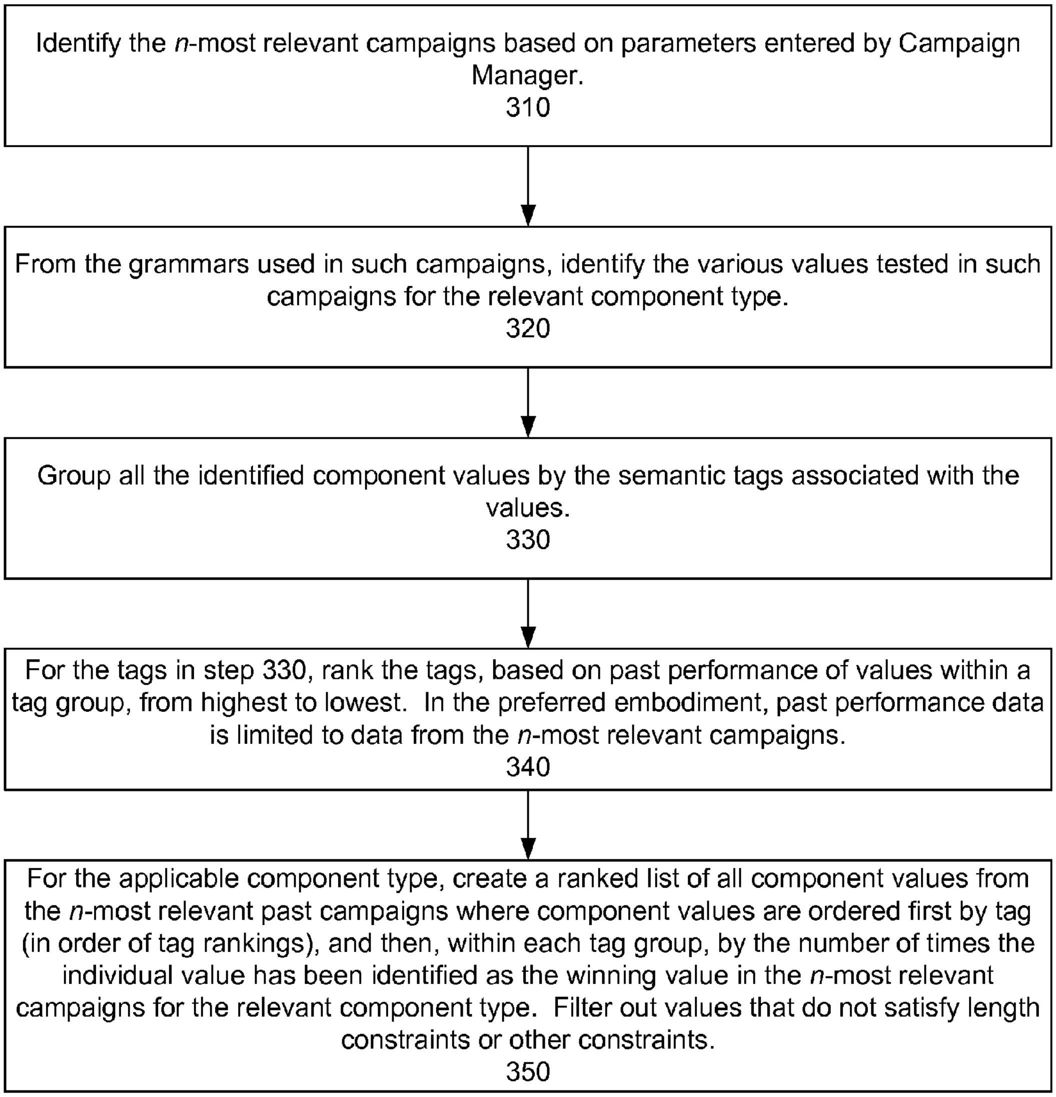
FIG. 3 is a flowchart that illustrates a method for generating a ranked list for previously tested values according to one embodiment of the invention.

FIG. 3 illustrates a method for generating a ranked list for previously tested values according to step 130 in FIG. 1. As a ranked list is generated for each component type in the grammar structure selected by the campaign manager, steps 320-350 of the method are performed for each component type in the grammar structure. The system identifies the n-most relevant campaigns based on parameters entered by the campaign manager (step 310). From the grammars used in such campaigns, the system identifies the various values tested in such campaigns for the relevant component type (step 320). In the preferred embodiment, only campaigns from the selected set that include the component type are considered. All of the identified component values are then grouped by the semantic tags associated with their values (step 330). The tags in step 330 are ranked based on past performance, in terms of response rate, of the values within a tag group, from the highest to the lowest, versus other tag groups (step 340). In the preferred embodiment, the past performance data is limited to data from the n-most relevant campaigns. The tag rankings reflect the performance of the tag group for the relevant component type in the n-most relevant campaigns. A ranked list of all component values (for the applicable component type) from the n-most relevant past campaigns is then created, wherein component values are ordered first by tag (in order of tag rankings), and then, within each tag group, by the number of times the individual value has been identified as the winning value in the n-most relevant campaigns for the relevant component type (step 350). The values that do not satisfy length constraints or other constraints are filtered out.

In one embodiment, the tags and component values are ranked as follows:

| Total | Tag 1 | Tag 2 | Tag 3 | . . . | Tag t |
|---|---|---|---|---|---|
| Tag 1 | m(1, 1)<br>m(1, Total) | m(1, 2) | m(1, 3) | . . . | m(1, t) |
| Tag 2 | m(2, 1) | m(2, 2)<br>m(2, Total) | m(2, 3) | . . . | m(2, t) |
| Tag 3 | m(3, 1) | m(3, 2) | m(3, 3)<br>m(3, Total) | . . . | m(3, t) |
| . . . | . . . | . . . | . . . | . . . | . . . |
| Tag t | m(t, 1) | m(t, 2) | m(t, 3) | . . . | m(t, t)<br>m(t, Total) |

For every cell value m(i, j), where $0<i\leq t$, $0<j\leq t$, and t is the number of tags in the system, information about Tag i competing against Tag j is computed as follows:

1. Compute the number of times a component text that is tagged with Tag i is chosen over a component text that is tagged with Tag j; compute the number of times a component text that is tagged with Tag j is chosen over a component text that is tagged with Tag i; compute the number of times the results show that the performance of Tag i and Tag j are not statistically different.
2. Using the above values, compute the ratio of wins to losses, ratio of wins to total, and take the weighted average for the aggregate score for each cell value.

For every cell value m(i, Total), a summary of the performance of Tag i across all tags is computed by aggregating all the cell scores in the row for that tag. The number may be zero as the two tags may have never competed against each other.

The above matrix may be computed each time the system recommends a new grammar because the campaign manager may give different parameters and the system may select a different set of n-most relevant campaigns.

The system ranks the tags from the highest Total to the lowest Total score. For each component type, a list is then created of all the component values grouped by tag and ordered first by tag and then within each tag by the number of times the individual component value has been identified as a winning value in any past grammar in the set of n-most relevant campaigns. From this list, the component values are selected to fill the grammar structure based on the design budget (e.g., if the design budget calls for four introduction component values, the system selects the first component value that comes from the top four component tag groups, filtering out inappropriate values based on constraints).

In one embodiment, if two tag groups are equal in performance (or are untested relative to each other), the ranking between the two tag groups is randomly determined. In another embodiment, the ranking is based on a predefined default. In still another embodiment, for breaking ties between tag groups, the system will consider a global ranked list that takes into account ranking information of all campaigns and not just the n-most relevant campaigns.

Depending on the ratio of conservatism to exploration indicated by the campaign manager, the system may add some untested values into the campaign. The more conservative the campaign, the more values are selected from the ranked list of tested values from previous, relevant campaigns, but the more exploratory the campaign, the fewer tested values are selected and the more untested, or little-tested values, are selected.

Figure 4:
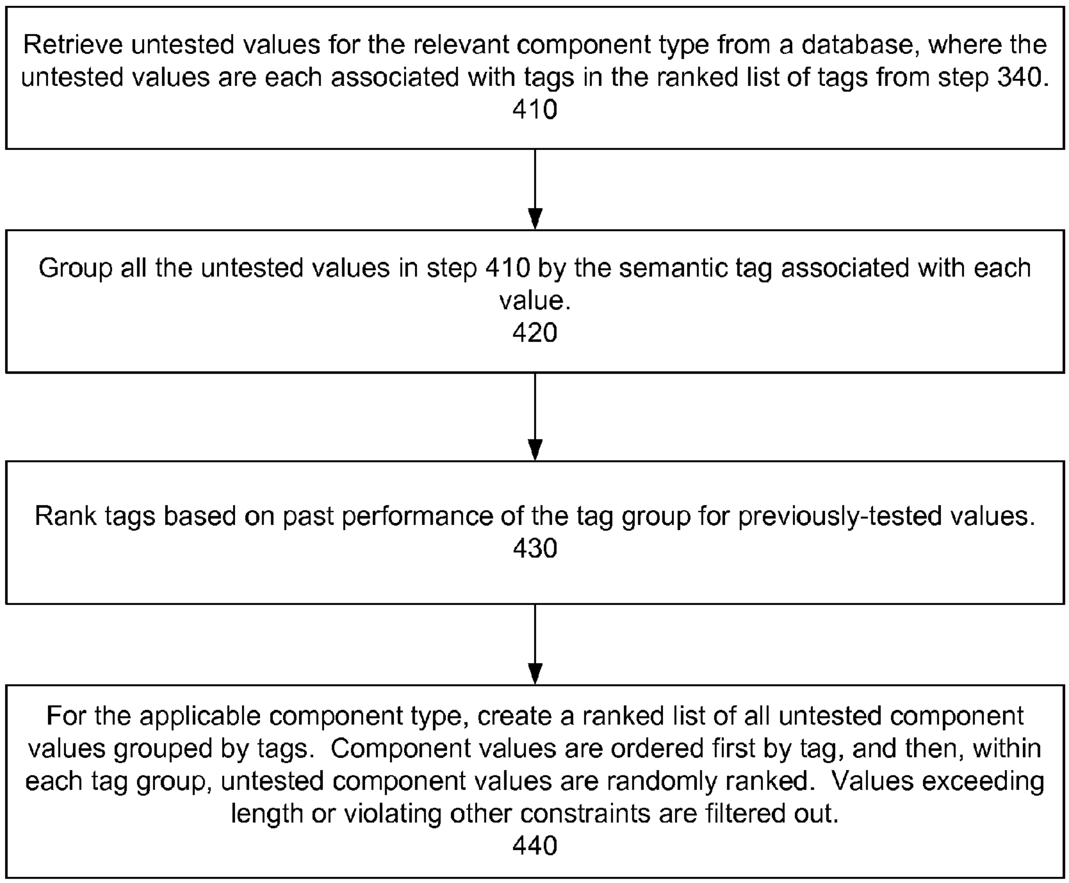
FIG. 4 is a flowchart that illustrates a method for generating a ranked list for previously untested values according to one embodiment of the invention.

FIG. 4 illustrates a method for generating a ranked list for previously untested values according to step 130 in FIG. 1. As is the case with the method of FIG. 3, this method is performed for each component type in the grammar structure selected by the campaign manager. The system retrieves untested values for the relevant component type from a database, where the untested values are each associated with tags in the ranked list of tags from step 340 (step 410). All of the untested values in step 410 are grouped by the semantic tag associated with each value (step 420). The tags are ranked based on past performance of the tag group for previously tested values (step 430). In other words, the tag rankings from step 340 in FIG. 3 are used. For the applicable component type, a ranked list of all untested component values grouped by tag is created (step 440). Component values are ordered first by tag, and then, within each tag group, untested components values are randomly ranked. Values exceeding length or violating other constraints are filtered out. In certain embodiments, an untested value that is not associated with a tag in the ranked list of tags from step 340 may be used. These untested values having untested/unranked tags would preferably be grouped together separately and used by a campaign manager who desires a greater degree of exploration or would like to test certain untested tags. In certain embodiments, the system may assign a confidence level to the untested value having a corresponding untested/unranked tag based on the tag's global ranking, which is its ranking across all campaigns and not just the n-most relevant campaigns.

From the lists generated according to the methods of FIGS. 3 and 4, the system recommends values for each of the component types in the grammar structure. The number of values recommended for each component type is based on the statistical design budget. In one embodiment, the mix of previously-tested values versus untested values in the recommendation depends on the level of exploration indicated by the campaign manager. In certain embodiments, the ratio of conservatism to exploration is determined by a sliding scale adjusted by the campaign manager in the user interface. In other embodiments, it is determined by a percentage inputted by the campaign manager. In still other embodiments, the system uses a default percentage mix (e.g., 25% untested values, 75% previously-tested values).

Figure 5:
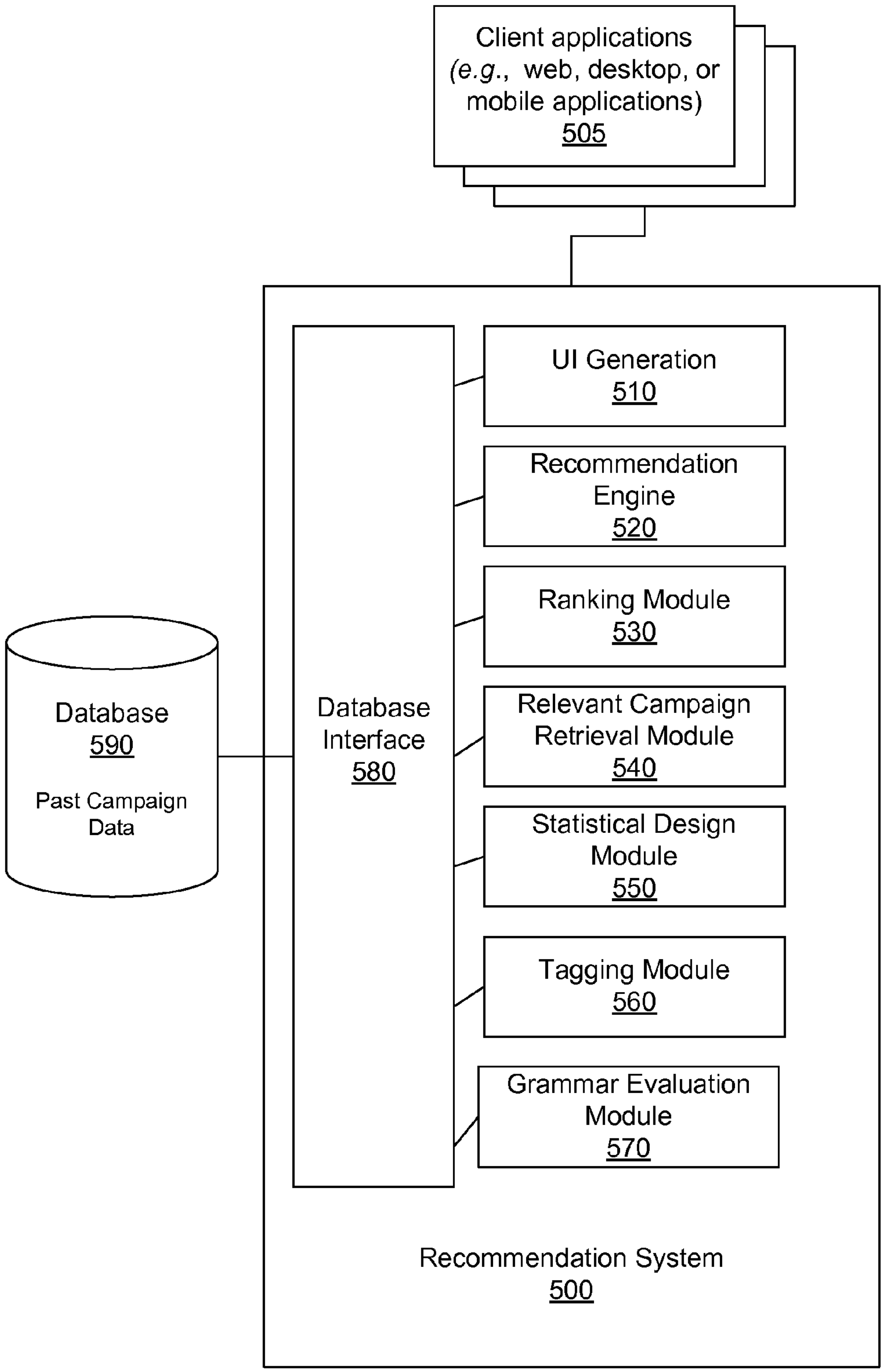
FIG. 5 is a block diagram of an exemplary software architecture for a recommendation system according to one embodiment of the invention.

FIG. 5 illustrates an exemplary system architecture for a Recommendation System 500. As a person skilled in the art would understand, the system architecture may be constructed in any number of ways, having more or less modules and different interconnectivity, within the scope of the present invention. The methods of FIGS. 1-4 may be implemented in other systems, and the invention is not limited to system 500.

Client Applications 505 provide a user interface via which users (e.g., campaign managers) can enter parameters for a new campaign and review and/or modify a recommended grammar. The Client Applications 505 may be run on any number of systems and may connect to the Recommendation System 500 through any number of channels. For example, the Client Applications 505 may include web, desktop, or mobile applications.

The Recommendation System 500 has a User Interface (UI) Generation Module 510, a Recommendation Engine 520, a Ranking Module 530, a Relevant Campaign Retrieval Module 540, a Statistical Design Module 550, a Tagging Module 560, a Grammar Evaluation Module 570, and a Database Interface 580.

The UI Generation Module 510 provides a user interface between the client applications 505 and the Recommendation Engine 520. The Recommendation Engine 520 recommends an initial grammar for the message campaign used by the message optimization system. The Ranking Module 530 ranks a plurality of semantic tags based on the past performance of the previously used values associated with each semantic tag. The Ranking Module 530 then orders the previously used values first by ranked tag group and then within each tag group. The plurality of untested values is grouped by semantic tag, but then randomly ordered within the tag group.

The Relevant Campaign Retrieval Module 540 retrieves the relevant past campaigns given the set of user specified input parameters. The Statistical Design Module 550 produces a set of statistical design budget options. The Tagging Module 560 interacts with the UI Generation Module 510 to allow the campaign manager to tag the components with semantic tags. The Grammar Evaluation Module 570 computes metrics for a recommended grammar given the set of input parameters. The Database Interface 580 interfaces with one or more databases 590, which functions to store past campaign data (e.g., the grammar for each campaign, the response rate for each tested value, the pValue indicating the statistical significance of the difference between tested values for a component, etc.).

The methods described with respect to FIGS. 1-4 are embodied in software and performed by a computer system executing the software. A person skilled in the art would understand that a computer system has a memory or other physical, computer-readable storage medium for storing software instructions and one or more processors for executing the software instructions.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method performed by a computer system for recommending a grammar for a message campaign used by a message optimization system, the method comprising:

providing a user interface that enables a campaign manager to specify one or more parameters for a new campaign, including audience size, effect size, and expected response rate;

calculating a set of statistical design budgets for the message campaign based on the audience size, effect size, and expected response rate specified by the campaign manager, wherein each statistical design budget specifies a number of components in a message and a number of values to test for each component;

recommending at least one grammar structure from one or more past campaigns that are within the set of statistical design budgets or from a default grammar that complies with the statistical design budget in the event that none of the past campaigns has a grammar within the set of statistical design budgets, the grammar structure specifying a plurality of message component types;

providing a user interface that enables a campaign manager to select one of the recommended grammar structures for the new campaign;

for each message component type in the selected grammar structure, generating a ranked list of previously-used values for the component type in the one or more past campaigns, wherein the previously-used values are each associated with a semantic tag and generating the ranked list comprises:

identifying the semantic tags associated with the previously-used values in the one or more past campaigns, wherein each semantic tag identifies the semantic meaning of the associated value, creating a list of the previously-used values in the one or more past campaigns grouped by semantic tag, ranking groups of semantic tags based on performance in the one or more past campaigns of the previously-used values within a tag group versus other tag groups, and ordering the previously-used values first by their ranked tag group and second, within each tag group, by the number of times an individual value has been identified as the winning value in the one or more past campaigns;

for each message component type in the selected grammar structure, generating a ranked list of untested values for the component type, wherein the untested values are each associated with a semantic tag and generating the ranked list comprises:

retrieving the untested values for the component type from a database, wherein each untested value is associated with a semantic tag that identifies the semantic meaning of the associated value and wherein each semantic tag is associated with a ranked tag group of previously-used values in the one or more past campaigns, creating a list of the untested values grouped by semantic tag, and ordering the untested values first by the ranked tag group and second, randomly within each tag group;

for each message component type, selecting a plurality of values to recommend testing based at least in part on the ranked list of previously-used values and the ranked list of untested values;

enabling the campaign manager to reject one or more of the recommended values;

in response to the campaign manager rejecting one or more of the recommended values, providing alternate recommended values for the rejected values; and generating variations of a message to test based on the grammar structure and values accepted by the campaign manager.

2. The method of claim 1, wherein the percentage of recommended untested values depends on a degree of exploration/conservatism indicated by the campaign manager.

3. The method of claim 1, wherein the recommended values are also selected in part from a group of untested values having an associated untested/unranked semantic tag.

4. The method of claim 3, wherein each untested value in the group of untested values is associated with a confidence level based on the global ranking of the untested value across all campaigns.

5. The method of claim 1, wherein one or more parameters in the user interface is associated with a drop down menu that lists the options available to the campaign manager for the parameter.

6. The method of claim 1, wherein the parameters also comprise campaign duration, audience characteristics, constraints, and objectives of the campaign.

7. The method of claim 6, wherein the campaign manager selects the objectives of the campaign via a drop down menu, from a sliding scale, or by inputting a value.

8. The method of claim 1, wherein if the campaign manager does not specify certain parameters, default values, empirically determined based on past campaigns, are used.

9. The method of claim 1, further comprising evaluating the recommended grammar based on various computed metrics.

10. The method of claim 1, wherein providing alternate recommended values for the rejected values comprises choosing values from the next best performing tag group or another candidate value associated with the same semantic tag as the previously rejected value.

11. A non-transitory computer-readable medium comprising code that, when executed by a computer system, enables the computer system to perform the following method for recommending a grammar for a message campaign used by a message optimization system, the method comprising:

enabling a campaign manager to specify one or more parameters for a new campaign, including audience size, effect size, and expected response rate;

calculating a set of statistical design budgets for the message campaign based on the audience size, effect size, and expected response rate specified by the campaign manager, wherein each statistical design budget specifies a number of components in a message and a number of values to test for each component;

recommending at least one grammar structure from one or more past campaigns that are within the set of statistical design budgets or from a default grammar that complies with the statistical design budget in the event that none of the past campaigns has a grammar within the set of statistical design budgets, the grammar structure specifying a plurality of message component types;

enabling a campaign manager to select one of the recommended grammar structures for the new campaign;

for each message component type in the selected grammar structure, generating a ranked list of previously-used values for the component type in the one or more past campaigns, wherein the previously-used values are each associated with a semantic tag and generating the ranked list comprises:

identifying the semantic tags associated with the previously-used values in the one or more past campaigns, wherein each semantic tag identifies the semantic meaning of the associated value, creating a list of the previously-used values in the one or more past campaigns grouped by semantic tag, ranking groups of semantic tags based on performance in the one or more past campaigns of the previously-used values within a tag group versus other tag groups, and ordering the previously-used values first by their ranked tag group and second, within each tag group, by the number of times an individual value has been identified as the winning value in the one or more past campaigns;

for each message component type in the selected grammar structure, generating a ranked list of untested values for the component type, wherein the untested values are each associated with a semantic tag and generating the ranked list comprises:

retrieving the untested values for the component type from a database, wherein each untested value is associated with a semantic tag that identifies the semantic meaning of the associated value and wherein each semantic tag is associated with a ranked tag group of previously-used values in the one or more past campaigns, creating a list of the untested values grouped by semantic tag, and ordering the untested values first by the ranked tag group and second, randomly within each tag group;

for each message component type, selecting a plurality of values to recommend testing based at least in part on the ranked list of previously-used values and the ranked list of untested values;

enabling the campaign manager to reject one or more of the recommended values;

in response to the campaign manager rejecting one or more of the recommended values, providing alternate recommended values for the rejected values; and generating variations of a message to test based on the grammar structure and values accepted by the campaign manager.

12. The non-transitory computer-readable medium of claim 11, wherein the percentage of recommended untested values depends on a degree of exploration/conservatism indicated by the campaign manager.

13. The non-transitory computer-readable medium of claim 11, wherein the recommended values are also selected in part from a group of untested values having an associated untested/unranked semantic tag.

14. The non-transitory computer-readable medium of claim 13, wherein each untested value in the group of untested values is associated with a confidence level based on the global ranking of the untested value across all campaigns.

15. The non-transitory computer-readable medium of claim 11, wherein enabling a campaign manager to specify parameters for a new campaign comprises providing a user interface wherein the campaign manager is prompted to enter parameters for the campaign.

16. The non-transitory computer-readable medium of claim 15, wherein one or more parameters in the user interface is associated with a drop down menu that lists the options available to the campaign manager for the parameter.

17. The non-transitory computer-readable medium of claim 15, wherein the parameters also comprise campaign duration, audience characteristics, constraints, and objectives of the campaign.

18. The non-transitory computer-readable medium of claim 17, wherein the campaign manager selects the objectives of the campaign via a drop down menu, from a sliding scale, or by inputting a value.

19. The non-transitory computer-readable medium of claim 15, wherein if the campaign manager does not specify certain parameters, default values, empirically determined based on past campaigns, are used.

20. The non-transitory computer-readable medium of claim 11, further comprising evaluating the recommended grammar based on various computed metrics.

21. The non-transitory computer-readable medium of claim 11, wherein providing alternate recommended values for the rejected values comprises choosing values from the next best performing tag group or another candidate value associated with the same semantic tag as the previously rejected value.

22. A computer system for recommending a grammar for a message campaign used by a message optimization system, the system comprising:

a processor;

a memory coupled to the processor, wherein the memory stores instructions that, when executed by the processor, causes the system to perform the operations of:

enabling a campaign manager to specify one or more parameters for a new campaign, including audience size, effect size, and expected response rate;

calculating a set of statistical design budgets for the message campaign based on the audience size, effect size, and expected response rate specified by the campaign manager, wherein each statistical design budget specifies a number of components in a message and a number of values to test for each component;

recommending at least one grammar structure from one or more past campaigns that are within the set of statistical design budgets or from a default grammar that complies with the statistical design budget in the event that none of the past campaigns has a grammar within the set of statistical design budgets, the grammar structure specifying a plurality of message component types;

enabling a campaign manager to select one of the recommended grammar structures for the new campaign;

for each message component type in the selected grammar structure, generating a ranked list of previously-used values for the component type in the one or more past campaigns, wherein the previously-used values are each associated with a semantic tag and generating the ranked list comprises:

identifying the semantic tags associated with the previously-used values in the one or more past campaigns, wherein each semantic tag identifies the semantic meaning of the associated value, creating a list of the previously-used values in the one or more past campaigns grouped by semantic tag, ranking groups of semantic tags based on performance in the one or more past campaigns of previously-used values within a tag group versus other tag groups, and ordering the previously-used values first by their ranked tag group and second, within each tag group, by the number of times an individual value has been identified as the winning value in the one or more past campaigns;

for each message component type in the selected grammar structure, generating a ranked list of untested values for the component type, wherein the untested values are each associated with a semantic tag and generating the ranked list comprises:

retrieving the untested values for the component type from a database, wherein each untested value is associated with a semantic tag that identifies the semantic meaning of the associated value and wherein each semantic tag is associated with a ranked tag group of previously-used values in the one or more past campaigns, creating a list of the untested values grouped by semantic tag, and ordering the untested values first by the ranked tag group and second, randomly within each tag group;

for each message component type, selecting a plurality of values to recommend testing based at least in part on the ranked list of previously-used values and the ranked list of untested values;

enabling the campaign manager to reject one or more of the recommended values;

in response to the campaign manager rejecting one or more of the recommended values, providing alternate recommended values for the rejected values; and generating variations of a message to test based on the grammar structure and values accepted by the campaign manager.

* * * * *